United States Patent
Xue et al.

(10) Patent No.: US 12,465,047 B2
(45) Date of Patent: Nov. 11, 2025

(54) PREPARATION METHOD FOR L-GLUFOSINATE-AMMONIUM POWDER

(71) Applicant: ZHEJIANG UNIVERSITY OF TECHNOLOGY, Hangzhou (CN)

(72) Inventors: Yaping Xue, Hangzhou (CN); Jie Mao, Hangzhou (CN); Feng Cheng, Hangzhou (CN); Shuping Zou, Hangzhou (CN); Jianmiao Xu, Hangzhou (CN); Yuguo Zheng, Hangzhou (CN)

(73) Assignee: ZHEJIANG UNIVERSITY OF TECHNOLOGY, Hangzhou (CN)

( * ) Notice: Subject to any disclaimer, the term of this patent is extended or adjusted under 35 U.S.C. 154(b) by 545 days.

(21) Appl. No.: 17/927,867

(22) PCT Filed: Dec. 26, 2020

(86) PCT No.: PCT/CN2020/139769
§ 371 (c)(1),
(2) Date: Nov. 25, 2022

(87) PCT Pub. No.: WO2022/041603
PCT Pub. Date: Mar. 3, 2022

(65) Prior Publication Data
US 2023/0225314 A1 Jul. 20, 2023

(30) Foreign Application Priority Data
Aug. 26, 2020 (CN) .......................... 202010873717.2

(51) Int. Cl.
*A01N 25/12* (2006.01)
*A01N 57/20* (2006.01)

(52) U.S. Cl.
CPC ............. *A01N 25/12* (2013.01); *A01N 57/20* (2013.01)

(58) Field of Classification Search
CPC .... A01N 25/12; A01N 57/20; C07B 2200/07; C07F 9/301
See application file for complete search history.

(56) References Cited

FOREIGN PATENT DOCUMENTS

| CN | 102127110 | 7/2011 |
|---|---|---|
| CN | 102568037 | 12/2011 |
| CN | 105541904 | 5/2016 |
| CN | 108484665 | 9/2018 |
| CN | 109369712 | 2/2019 |
| CN | 109485673 | 3/2019 |
| CN | 109651433 | 4/2019 |
| CN | 110791484 | 2/2020 |
| CN | 111321193 | 6/2020 |
| WO | WO2018108797 | 6/2018 |
| WO | WO2020145514 | 7/2020 |
| WO | WO2020145627 | 7/2020 |

*Primary Examiner* — Mina Haghighatian
*Assistant Examiner* — Nathan W Schlientz
(74) *Attorney, Agent, or Firm* — Jiwen Chen; Joywin IP Law PLLC

(57) ABSTRACT

The present invention discloses a method for preparing L-glufosinate ammonium powder. The method includes the following steps: (1) obtaining a transformation solution for performing biocatalytic transformation to prepare L-glufosinate ammonium, and filtering out bacteria to obtain a filtrate; (2) detecting the amount of ammonium sulfate in the filtrate obtained in step (1), adding calcium hydroxide or calcium oxide to react with the ammonium sulfate to produce calcium sulfate precipitates, and filtering out the calcium sulfate precipitates to obtain a filtrate; (3) detecting the amount of glufosinate ammonium in the filtrate obtained in step (2), adding zinc salt, adjusting pH to 5.5-6.8 to produce glufosinate ammonium zinc salt precipitates, and filtering and collecting the glufosinate ammonium zinc salt precipitates; (4) adding a solvent to dissolve the glufosinate ammonium zinc salt precipitates collected in step (3), and adjusting pH of a solution to 2-2.5 to produce L-glufosinate ammonium precipitates; and (5) recrystallizing the L-glufosinate ammonium precipitates obtained in step (4) to obtain purified L-glufosinate ammonium powder. The method provided by the present invention is simple to operate and low in cost, and has a better industrialization prospect.

9 Claims, 1 Drawing Sheet

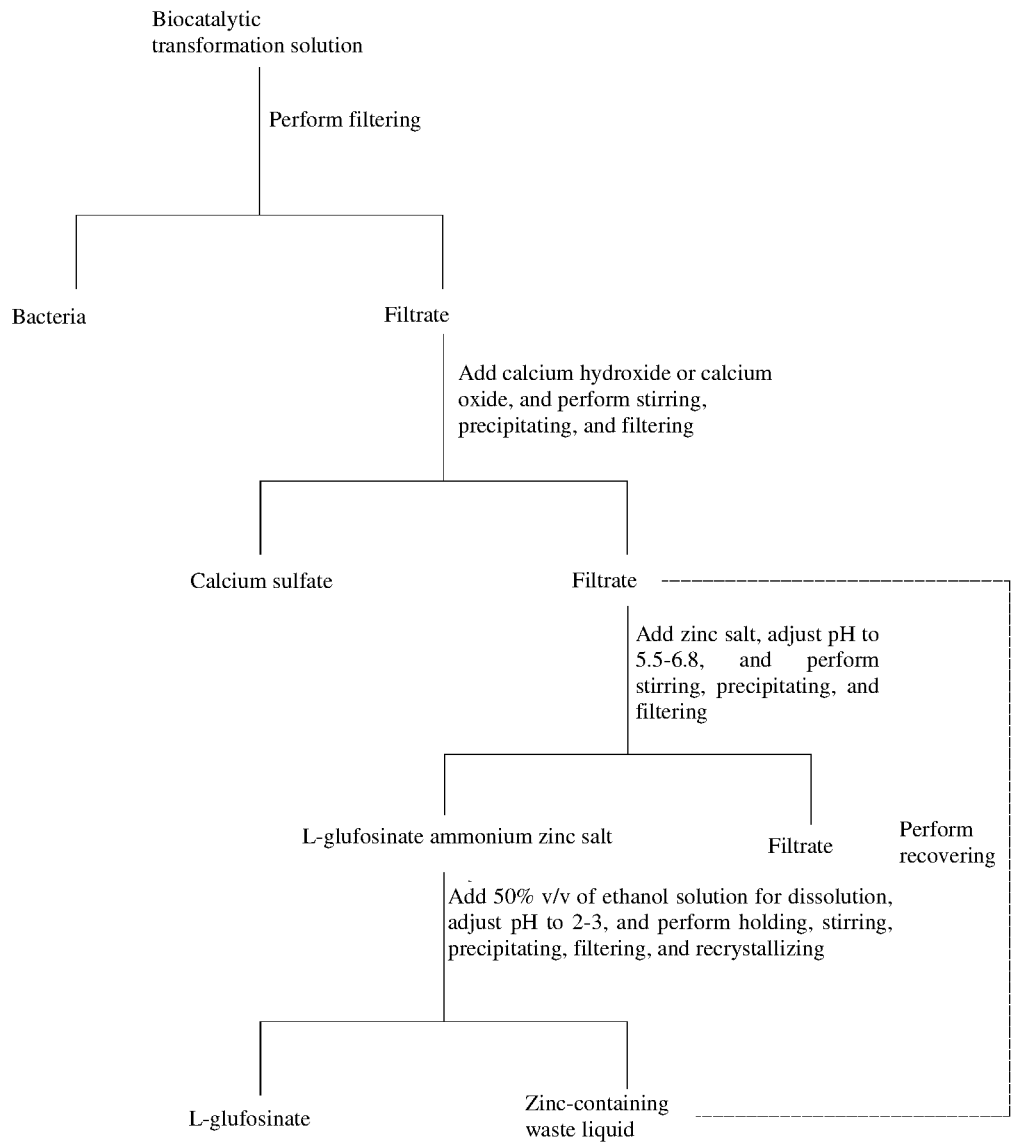

PREPARATION METHOD FOR L-GLUFOSINATE-AMMONIUM POWDER

This is a U.S. national stage application of PCT Application No. PCT/CN2020/139769 under 35 U.S.C. 371, filed Dec. 26, 2020 in Chinese, claiming priority of Chinese Application No. 202010873717.2, filed Aug. 26, 2020, all of which are hereby incorporated by reference.

TECHNICAL FIELD

The present invention relates to the field of biotechnology, in particular to a method for preparing L-glufosinate ammonium powder.

BACKGROUND TECHNOLOGY

Glufosinate ammonium is also known as Phosphinothricin with a full chemical name of 4-[hydroxy(methyl)phosphonyl]-D, L-homoalanine or ammonium 2-amino-4-[hydroxy(methyl)phosphonyl]butanoate. The compound is a broad-spectrum contact-killing sterilant herbicide successfully developed by the company Hoechst in the 1980s, which belongs to phosphonic acid herbicides. It inhibits glutamine synthases in nitrogen metabolism pathways of plants, such that ammonium ions are accumulated to wither the plants. Glufosinate ammonium has high activity, broad herbicidal spectrum, low toxicity and good environmental compatibility.

Glufosinate ammonium has chirality, and is usually a racemate of L type and D type. Only L-glufosinate ammonium has an herbicidal effect, and the D type is almost inactive. Under the same effect, the usage amount of optically pure L-glufosinate ammonium is half of the racemate D, L-glufosinate ammonium. How to obtain optically pure L-glufosinate ammonium is of great significance, which can not only improve the atom economy but also reduce the usage cost and the environmental pressure.

General methods for selectively synthesizing glufosinate ammonium in biosynthesis include production of L-glufosinate ammonium by protease hydrolysis of bialaphos; preparation of L-glufosinate ammonium by deacetylase, aminoacylase or amidase resolution of D, L-glufosinate ammonium; and asymmetric synthesis of L-glufosinate ammonium from PPO (2-oxo-4-[(hydroxy)(methyl)phosphinoyl], a product of glufosinate deamination) butanoic acid as a raw material by amino acid dehydrogenase or transaminase.

Brian Michael Green et al. (U.S. Pat. No. 9,834,802 B2) disclosed a complete production route for obtaining L-glufosinate ammonium from D, L-glufosinate ammonium through two-step enzymatic catalysis. Our team has further improved the production route, which is embodied in patents such as CN111321193A, CN109576236A, CN109609474A, etc.

Compared with a chemical route, the biocatalytic process for asymmetric synthesis of L-glufosinate ammonium from the PPO (poly(phenylene oxide)) as the raw material is relatively simple in feeding, and main additives in the process are an amino donor, namely, ammonium sulfate and a coenzyme substrate, namely, glucose. At present, there are few researches on a downstream purification route in production of glufosinate ammonium. For a route for producing glufosinate ammonium by a chemical reaction, a purification method generally involves removing impurities after an esterification reaction in an organic solvent and then performing hydrolysis with hydrochloric acid to obtain hydrochloride or performing an ammoniation reaction to obtain ammonium salt (patents CN102268037A, CN105541904A, etc.). For a route for producing glufosinate ammonium by a biocatalytic reaction, a purification method generally involves membrane filtration (patent CN102127110B), ion exchange (patent CN108484665A), calcium salt precipitate redissolution (patent CN109369712A), etc.

For the newly developed route for asymmetric synthesis of glufosinate ammonium, gluconic acid produced during the process will form a solution in equilibrium with gluconolactone. Patents CN109485673A and CN109651433A have done certain research on the separation of L-glufosinate ammonium and gluconic acid, but have not yet achieved a better separation effect.

SUMMARY OF THE INVENTION

An object of the present invention is to provide a convenient, effective and economical method for preparing L-glufosinate ammonium powder. The method is simple to operate and high in recovery rate and product purity, and byproducts in processes can be converted into products with certain value.

The present invention provides a method for preparing L-glufosinate ammonium powder, comprising the following steps:

(1) obtaining a transformation solution for performing biocatalytic transformation to prepare L-glufosinate ammonium, and filtering out bacteria to obtain a filtrate;

(2) detecting the amount of ammonium sulfate in the filtrate obtained in step (1), adding calcium hydroxide or calcium oxide to react with the ammonium sulfate to produce calcium sulfate precipitates, and filtering out the calcium sulfate precipitates to obtain a filtrate;

(3) detecting the amount of glufosinate ammonium in the filtrate obtained in step (2), adding zinc salt, adjusting pH to 5.5-6.8 to produce glufosinate ammonium zinc salt precipitates, and filtering and collecting the glufosinate ammonium zinc salt precipitates, wherein the zinc salt is zinc nitrate or zinc chloride;

(4) adding a solvent to dissolve the glufosinate ammonium zinc salt precipitates collected in step (3), and adjusting pH of a solution to 2-2.5 to produce L-glufosinate ammonium precipitates; and (5) recrystallizing the L-glufosinate ammonium precipitates obtained in step (4) to obtain purified L-glufosinate ammonium powder.

In step (1), the concentration of the L-glufosinate ammonium in the transformation solution is 70-80 g/L, the concentration of the ammonium sulfate is 20-30 g/L, and the concentration of gluconic acid is 35-45 g/L.

The filtrate obtained in step (1) is concentrated under reduced pressure at 65° C. to 31-33% of the volume before concentration.

In step (2), the addition amount of the calcium hydroxide or the calcium oxide is at least equimolar with the amount of the ammonium sulfate; and in step (3), the addition amount of the zinc salt is 1.0-1.5 times the amount of the glufosinate ammonium in molar mass.

In step (3), when pH reaches 5.5-6.8, zinc ions are combined with carboxylate ions and phosphate ions of the glufosinate ammonium to form less soluble glufosinate ammonium zinc salt to be precipitated, while the solubility of zinc gluconate and the like in water is higher, and the filtrate is taken away, such that obtained L-glufosinate ammonium zinc salt is relatively pure.

Ammonia water is used for pH adjustment in step (3), and phosphoric acid, hydrochloric acid or sulfuric acid is used for pH adjustment in step (4).

In step (4), pH is adjusted to 2-2.5, an isoelectric point of the L-glufosinate ammonium is pH 2.66, and the pH value is adjusted to be near the isoelectric point of the L-glufosinate ammonium, such that the L-glufosinate ammonium is precipitated out and separated from a zinc salt solution.

In step (4), if a phosphoric acid solution is selected to adjust pH to be near 2.5, zinc phosphate precipitates and a solution containing the L-glufosinate ammonium are mainly formed, which can simplify the recovery process for zinc salt. The addition amount of the phosphoric acid should be appropriate; when the addition amount is too large, it makes separation difficult as zinc phosphate is easily soluble in an inorganic acid solution; and when the addition amount is too small, the zinc salt is recovered incompletely.

The solvent used in step (4) is an aqueous ethanol solution with a volume concentration of 50%; and the concentration of dissolved glufosinate ammonium zinc salt is 200-400 g/L.

During the recrystallization in step (5), the L-glufosinate ammonium precipitates are dissolved in the aqueous ethanol solution or an aqueous acetone solution, concentrated under reduced pressure and recrystallized.

A volume concentration of the aqueous ethanol solution or the aqueous acetone solution during the recrystallization in step (5) is 90%, and the mass of the aqueous ethanol solution or the aqueous acetone solution added is 5-7 times the mass of the L-glufosinate ammonium precipitates. Precipitates obtained by recrystallization in step (5) are dried in vacuum to obtain the purified L-glufosinate ammonium powder. A vacuum drying temperature is 60° C.

The filtrates containing the zinc salt involved in steps (3) and (4) can be recycled through a cation exchange resin or conversion to water-insoluble zinc phosphate. Preferably, supernates containing zinc ions in step (3) and step (4) are combined, then pH is adjusted to be more than 7 to produce zinc hydroxide precipitates, the zinc hydroxide precipitates are separated, and nitric acid or hydrochloric acid is added to dissolve the zinc hydroxide precipitates to obtain zinc nitrate or zinc chloride for reuse.

The beneficial effects of the present invention are mainly as follows:
(1) The method provided by the present invention is simple to operate, short in steps, low in actual cost and easy to realize, and has a better industrialization prospect.
(2) According to the present invention, a purification technology of a newly developed production route for L-glufosinate ammonium is comprehensively analyzed and researched, and finally obtained L-glufosinate ammonium has high purity and yield.
(3) An additive used in the present invention can be recycled, such that the concept of sustainable development is good.

BRIEF DESCRIPTION OF THE DRAWINGS

FIG. 1 is a flow chart of a method provided by the present invention.

DETAILED DESCRIPTION OF THE EMBODIMENTS

The present invention is further described below in combination with specific implementation modes, but the scope of protection the present invention is not limited thereto.

An object purified in the present invention is a transformation solution obtained by two-step catalysis of a D-amino acid oxidase mutant and a glufosinate dehydrogenase mutant used by the inventor, where after a reaction, a concentration of glufosinate is 70-80 g/L, a concentration of ammonium sulfate is 20-30 g/L, a concentration of gluconic acid is 35-45 g/L, and a small amount of glucose or impurities is/are remained. A specific catalytic conversion process can be seen in patent CN111363775A. Enzymes disclosed in patents CN109576236A or CN110791484A may be also used as enzymes involved in catalytic conversion. In a first reaction, D-glufosinate ammonium in D, L-glufosinate ammonium is catalytically oxidized to 2-carbonyl-4-[hydroxy(methyl)phosphonyl]butanoic acid by a D-amino acid oxidase mutant, and in a second reaction, the 2-carbonyl-4-[hydroxy(methyl)phosphonyl]butanoic acid is catalytically reduced to L-glufosinate ammonium by glufosinate dehydrogenase.

A method for preparing L-glufosinate ammonium powder in the present invention is as shown in FIG. 1.

Example 1

(1) 200 mL of a transformation solution subjected to heat preservation and removal of bacteria, in which the concentrations of L-glufosinate ammonium, ammonium sulfate, and gluconic acid are respectively 75.74 g/L, 19.82 g/L, and 41.23 g/L, was concentrated under reduced pressure at 65° C. to 65.91 mL; 2.23 g of calcium hydroxide was added to a concentrated solution, stirring was performed, filtering is was performed to obtain a filtrate I, and precipitates were dried and weighed to obtain 4.09 g of precipitates.

(2) 29.32 g of zinc nitrate hexahydrate was added to the filtrate I, 21.80 mL of ammonia water was slowly added dropwise to adjust pH to 5.5, stirring was performed, precipitation was performed, and filtering was performed to obtain precipitates I with a mass of 19.53 g.

(3) The precipitates I were dissolved in 50.22 mL of a water and ethanol mixed solvent (a volume concentration of ethanol is 50%), 16.67 mL of a hydrochloric acid solution (6 M) was slowly added dropwise to adjust pH to 2.5, holding was performed, and obtained precipitates were recrystallized with an aqueous ethanol solution with the mass 5 times the mass of the precipitates and a volume concentration of 90% as a recrystallization solution and then were dried in vacuum at 60° C. to obtain 14.89 g of L-glufosinate ammonium powder. The purity was 98.92% by high-performance liquid chromatography (HPLC) analysis, and the calculated total yield was 97.24%.

Example 2

(1) 200 mL of a transformation solution subjected to heat preservation and removal of bacteria, in which the concentrations of L-glufosinate ammonium, ammonium sulfate, and gluconic acid are respectively 75.74 g/L, 19.82 g/L, and 41.23 g/L, was concentrated under reduced pressure at 65° C. to 63.45 mL; 2.23 g of calcium hydroxide was added to a concentrated solution, stirring was performed, filtering is was performed to obtain a filtrate I, and precipitates were dried and weighed to obtain 4.11 g of precipitates.

(2) 28.05 g of zinc nitrate hexahydrate was added to the filtrate I, 21.38 mL of ammonia water was slowly added dropwise to adjust pH to 5.5, stirring was performed, precipitation was performed, and filtering was performed to obtain precipitates I with a mass of 19.48 g.

(3) The precipitates I were dissolved in 50.69 mL of a water and ethanol mixed solvent (a volume concentration of ethanol is 50%), 18.03 mL of a hydrochloric acid solution (6 M) was slowly added dropwise to adjust pH to 2.0, holding was performed, and obtained precipitates were recrystallized with an aqueous ethanol solution with the mass 5 times the mass of the precipitates and a volume concentration of 90% as a recrystallization solution and then were dried in vacuum at 60° C. to obtain 14.95 g of L-glufosinate ammonium powder. The purity was 98.24% by HPLC analysis, and the calculated total yield was 96.96%.

Example 3

(1) 200 mL of a transformation solution subjected to heat preservation and removal of bacteria, in which the concentrations of L-glufosinate ammonium, ammonium sulfate, and gluconic acid are respectively 75.74 g/L, 19.82 g/L, and 41.23 g/L, was concentrated under reduced pressure at 65° C. to 64.36 mL; 2.23 g of calcium hydroxide was added to a concentrated solution, stirring was performed, filtering is was performed to obtain a filtrate I, and precipitates were dried and weighed to obtain 4.08 g of precipitates.

(2) 29.28 g of zinc nitrate hexahydrate was added to the filtrate I, 24.20 mL of ammonia water was slowly added dropwise to adjust pH to 6.8, stirring was performed, precipitation was performed, and filtering was performed to obtain precipitates I with a mass of 19.50 g.

(3) The precipitates I were dissolved in 48.81 mL of a water and ethanol mixed solvent (a volume concentration of ethanol is 50%), 20.25 mL of a hydrochloric acid solution (6 M) was slowly added dropwise to adjust pH to 2.5, holding was performed, and obtained precipitates were recrystallized with an aqueous ethanol solution with the mass 7 times the mass of the precipitates and a volume concentration of 90% as a recrystallization solution and then were dried in vacuum at 60° C. to obtain 14.88 g of L-glufosinate ammonium powder. The purity was 98.65% by high-performance liquid chromatography (HPLC) analysis, and the calculated total yield was 96.90%.

Example 4

(1) 200 mL of a transformation solution subjected to heat preservation and removal of bacteria, in which the concentrations of L-glufosinate ammonium, ammonium sulfate, and gluconic acid are respectively 75.74 g/L, 19.82 g/L, and 41.23 g/L, was concentrated under reduced pressure at 65° C. to 62.52 mL; 2.23 g of calcium hydroxide was added to a concentrated solution, stirring was performed, filtering is was performed to obtain a filtrate I, and precipitates were dried and weighed to obtain 4.09 g of precipitates.

(2) 28.65 g of zinc nitrate hexahydrate was added to the filtrate I, 22.57 mL of ammonia water was slowly added dropwise to adjust pH to 6.8, stirring was performed, precipitation was performed, and filtering was performed to obtain precipitates I with a mass of 19.25 g.

(3) The precipitates I were dissolved in 50.45 mL of a water and ethanol mixed solvent (a volume concentration of ethanol is 50%), 21.41 mL of a hydrochloric acid solution (6 M) was slowly added dropwise to adjust pH to 2.0, holding was performed, and obtained precipitates were recrystallized with an aqueous ethanol solution with the mass 7 times the mass of the precipitates and a volume concentration of 90% as a recrystallization solution and then were dried in vacuum at 60° C. to obtain 14.66 g of L-glufosinate ammonium powder. The purity was 98.89% by HPLC analysis, and the calculated total yield was 95.70%.

Example 5

(1) 200 mL of a transformation solution subjected to heat preservation and removal of bacteria, in which the concentrations of L-glufosinate ammonium, ammonium sulfate, and gluconic acid are respectively 75.74 g/L, 19.82 g/L, and 41.23 g/L, was concentrated under reduced pressure at 65° C. to 64.05 mL; 2.23 g of calcium hydroxide was added to a concentrated solution, stirring was performed, filtering is was performed to obtain a filtrate I, and precipitates were dried and weighed to obtain 4.12 g of precipitates.

(2) 22.75 g of zinc nitrate hexahydrate was added to the filtrate I, 22.08 mL of ammonia water was slowly added dropwise to adjust pH to 6.5, stirring was performed, precipitation was performed, and filtering was performed to obtain precipitates I with a mass of 19.50 g.

(3) The precipitates I were dissolved in 49.06 mL of a water and ethanol mixed solvent (a volume concentration of ethanol is 50%), 17.18 mL of a hydrochloric acid solution (6 M) was slowly added dropwise to adjust pH to 2.0, holding was performed, and obtained precipitates were recrystallized with an aqueous ethanol solution with the mass 5 times the mass of the precipitates and a volume concentration of 90% as a recrystallization solution and then were dried in vacuum at 60° C. to obtain 15.05 g of L-glufosinate ammonium powder. The purity was 98.12% by HPLC analysis, and the calculated total yield was 97.49%.

Example 6

(1) 200 mL of a transformation solution subjected to heat preservation and removal of bacteria, in which the concentrations of L-glufosinate ammonium, ammonium sulfate, and gluconic acid are respectively 75.74 g/L, 19.82 g/L, and 41.23 g/L, was concentrated under reduced pressure at 65° C. to 66.15 mL; 2.23 g of calcium hydroxide was added to a concentrated solution, stirring was performed, filtering is was performed to obtain a filtrate I, and precipitates were dried and weighed to obtain 4.10 g of precipitates.

(2) 34.11 g of zinc nitrate hexahydrate was added to the filtrate I, 22.47 mL of ammonia water was slowly added dropwise to adjust pH to 6.5, stirring was performed, precipitation was performed, and filtering was performed to obtain precipitates I with a mass of 19.43 g.

(3) The precipitates I were dissolved in 50.88 mL of a water and ethanol mixed solvent (a volume concentration of ethanol is 50%), 17.92 mL of a hydrochloric acid solution (6 M) was slowly added dropwise to adjust pH to 2.0, holding was performed, and obtained precipitates were recrystallized with an aqueous ethanol solution with the mass 7 times the mass of the precipitates and a volume concentration of 90% as a recrystallization solution and then were dried in vacuum at 60° C. to obtain 14.91 g of L-glufosinate ammonium powder. The purity was 98.17% by HPLC analysis, and the calculated total yield was 96.63%.

Example 7

(1) 200 mL of a transformation solution subjected to heat preservation and removal of bacteria, in which the concentrations of L-glufosinate ammonium, ammonium sulfate, and gluconic acid are respectively 75.74 g/L, 19.82 g/L, and 41.23 g/L, was concentrated under reduced pressure at 65° C. to 64.73 mL; 2.23 g of calcium hydroxide was added to a concentrated solution, stirring was performed, filtering is was performed to obtain a filtrate I, and precipitates were dried and weighed to obtain 4.09 g of precipitates.
(2) 13.02 g of zinc chloride was added to the filtrate I, 21.36 mL of ammonia water was slowly added dropwise to adjust pH to 6.5, stirring was performed, precipitation was performed, and filtering was performed to obtain precipitates I with a mass of 19.42 g.
(3) The precipitates I were dissolved in 46.71 mL of a water and ethanol mixed solvent (a volume concentration of ethanol is 50%), 15.41 mL of a hydrochloric acid solution (6 M) was slowly added dropwise to adjust pH to 2.0, holding was performed, and obtained precipitates were recrystallized with an aqueous ethanol solution with the mass 7 times the mass of the precipitates and a volume concentration of 90% as a recrystallization solution and then were dried in vacuum at 60° C. to obtain 14.62 g of L-glufosinate ammonium powder. The purity was 98.40% by HPLC analysis, and the calculated total yield was 94.97%.

Example 8

(1) 139.14 mL of a zinc-containing waste liquid produced in steps (2) and (3) in Example 1 was collected, 44.53 mL of a 6 M sodium hydroxide solution was added to adjust pH to 11, holding was performed, and filtering was performed to collect 8.96 g of precipitates.
(2) The precipitates were dissolved in 50 mL of a 6 M nitric acid solution, and were concentrated under reduced pressure to obtain 26.15 g of white solid with a yield of 89.19%.

Example 9

(1) 200 mL of a transformation solution subjected to heat preservation and removal of bacteria, in which the concentrations of L-glufosinate ammonium, ammonium sulfate, and gluconic acid are respectively 75.74 g/L, 19.82 g/L, and 41.23 g/L, was concentrated under reduced pressure at 65° C. to 63.71 mL; 2.23 g of calcium hydroxide was added to a concentrated solution, stirring was performed, filtering is was performed to obtain a filtrate I, and precipitates were dried and weighed to obtain 4.12 g of precipitates.
(2) 31.84 g of zinc nitrate hexahydrate was added to the filtrate I, 20.74 mL of ammonia water was slowly added dropwise to adjust pH to 6.5, stirring was performed, precipitation was performed, and filtering was performed to obtain precipitates I with a mass of 19.58 g.
(3) The precipitates I were dissolved in 50.24 mL of a water and ethanol mixed solvent (a volume concentration of ethanol is 50%), 11.58 mL of a hydrochloric acid solution (6 M) was slowly added dropwise to adjust pH to 2.5, holding was performed, a collected filtrate is concentrated under reduced pressure to obtain crystals, the crystals were recrystallized with an aqueous ethanol solution with the mass 7 times the mass of the crystals and a volume concentration of 90% as a recrystallization solution and then were dried in vacuum at 60° C. to obtain 14.54 g of L-glufosinate ammonium powder. The purity was 95.91% by HPLC analysis, and the calculated total yield was 92.06%. It is considered that after a phosphoric acid solution was added to form zinc phosphate, a part of the zinc phosphate is dissolved in an inorganic acid environment, and the zinc phosphate is insoluble in ethanol and water and is difficult to separate from a product during the recrystallization, thus affecting the purity and yield.

Example 10

(1) 200 mL of a transformation solution subjected to heat preservation and removal of bacteria, in which the concentrations of L-glufosinate ammonium, ammonium sulfate, and gluconic acid are respectively 75.74 g/L, 19.82 g/L, and 41.23 g/L, was concentrated under reduced pressure at 65° C. to 62.19 mL to obtain a concentrated solution I.
(2) 29.28 g of zinc nitrate hexahydrate was added to the concentrated solution I, 20.65 mL of ammonia water was slowly added dropwise to adjust pH to 6.5, stirring was performed, precipitation was performed, and filtering was performed to obtain precipitates I with a mass of 13.25 g. The precipitates I here were transparent clear crystals, which were supposed to be milky white precipitates.
(3) The precipitates I were dissolved in 30.14 mL of water, 10.41 mL of a hydrochloric acid solution (6 M) was slowly added dropwise to adjust pH to 2.0, this solution was directly diluted by 500 times, and a liquid phase analysis was made to obtain L-glufosinate ammonium with a concentration of 69.52 g/and a yield of 18.61%.

In this example, ammonium sulfate was not removed in step (1), which resulted in failure of a purification process. It was considered that the presence of zinc ions promoted the formation of ammonium sulfate crystals, which affected the purification process.

Example 11

(1) 200 mL of a transformation solution subjected to heat preservation and removal of bacteria, in which the concentrations of L-glufosinate ammonium, ammonium sulfate, and gluconic acid are respectively 75.74 g/L, 19.82 g/L, and 41.23 g/L, was concentrated under reduced pressure at 65° C. to 63.11 mL; 2.23 g of calcium hydroxide was added to a concentrated solution, stirring was performed, filtering is was performed to obtain a filtrate I, and precipitates were dried and weighed to obtain 4.11 g of precipitates.
(2) 28.58 g of zinc sulphate heptahydrate was added to the filtrate I, 21.29 mL of ammonia water was slowly added dropwise to adjust pH to 6.5, stirring was performed, precipitation was performed, and filtering was performed to obtain precipitates I with a mass of 19.45 g. The precipitates I here were transparent clear crystals, which were supposed to be milky white precipitates.
(3) The precipitates I were dissolved in 50.42 mL of water, 18.22 mL of a hydrochloric acid solution (6 M) was slowly added dropwise to adjust pH to 2.0, this solution was directly diluted by 500 times, and a liquid phase analysis was made to obtain L-glufosinate ammonium with a concentration of 34.27 g/and a yield of 15.53%.

In this example, ammonium sulfate was removed by adding calcium hydroxide in step (1), but precipitation was performed by using zinc sulfate in step (2), resulting in failure of a purification process. It was considered that the presence of zinc ions promoted the formation of ammonium sulfate crystals, thereby affecting the purification process.

The invention claimed is:

1. A method for preparing L-glufosinate ammonium powder, comprising the following steps:
   (1) obtaining a transformation solution for performing biocatalytic transformation to prepare L-glufosinate ammonium, and filtering out bacteria to obtain a filtrate;
   (2) detecting the amount of ammonium sulfate in the filtrate obtained in step (1), adding calcium hydroxide or calcium oxide to react with the ammonium sulfate to produce calcium sulfate precipitates, and filtering out the calcium sulfate precipitates to obtain a filtrate;
   (3) detecting the amount of glufosinate ammonium in the filtrate obtained in step (2), adding zinc salt, adjusting pH to 5.5-6.8 to produce glufosinate ammonium zinc salt precipitates, and filtering and collecting the glufosinate ammonium zinc salt precipitates,
   wherein the zinc salt is zinc nitrate or zinc chloride;
   (4) adding a solvent to dissolve the glufosinate ammonium zinc salt precipitates collected in step (3), and adjusting pH of a solution to 2-2.5 to produce L-glufosinate ammonium precipitates; and
   (5) recrystallizing the L-glufosinate ammonium precipitates obtained in step (4) to obtain purified L-glufosinate ammonium powder.

2. The method for preparing L-glufosinate ammonium powder according to claim 1, wherein in step (1), the concentration of the L-glufosinate ammonium in the transformation solution is 70-80 g/L, the concentration of the ammonium sulfate is 20-30 g/L, and the concentration of gluconic acid is 35-45 g/L.

3. The method for preparing L-glufosinate ammonium powder according to claim 1, wherein the filtrate obtained in step (1) is concentrated under reduced pressure at 65° C. to 31-33% of the volume before concentration.

4. The method for preparing L-glufosinate ammonium powder according to claim 1, wherein in step (2), the addition amount of the calcium hydroxide or the calcium oxide is at least equimolar with the amount of the ammonium sulfate; and in step (3), the addition amount of the zinc salt is 1.0-1.5 times the amount of the glufosinate ammonium in molar mass.

5. The method for preparing L-glufosinate ammonium powder according to claim 1, wherein ammonia water is used for pH adjustment in step (3), and phosphoric acid, hydrochloric acid or sulfuric acid is used for pH adjustment in step (4).

6. The method for preparing L-glufosinate ammonium powder according to claim 1, wherein the solvent used in step (4) is an aqueous ethanol solution with a volume concentration of 50%; and the concentration of dissolved glufosinate ammonium zinc salt is 200-400 g/L.

7. The method for preparing L-glufosinate ammonium powder according to claim 1, wherein during the recrystallization in step (5), the L-glufosinate ammonium precipitates are dissolved in an aqueous ethanol solution or an aqueous acetone solution, concentrated under reduced pressure and recrystallized.

8. The method for preparing L-glufosinate ammonium powder according to claim 7, wherein a volume concentration of the aqueous ethanol solution or the aqueous acetone solution during the recrystallization in step (5) is 90%, and the mass of the aqueous ethanol solution or the aqueous acetone solution added is 5-7 times the mass of the L-glufosinate ammonium precipitates; and precipitates obtained by recrystallization in step (5) are dried in vacuum to obtain the purified L-glufosinate ammonium powder.

9. The method for preparing L-glufosinate ammonium powder according to claim 7, wherein supernates containing zinc ions in step (3) and step (4) are combined, then pH is adjusted to be more than 7 to produce zinc hydroxide precipitates, the zinc hydroxide precipitates are separated, and nitric acid or hydrochloric acid is added to dissolve the zinc hydroxide precipitates to obtain zinc nitrate or zinc chloride for reuse.

* * * * *